Aug. 24, 1954     K. L. KNOX     2,686,931
APPARATUS FOR EXTRUDING BEADED FILM
Filed Oct. 27, 1952
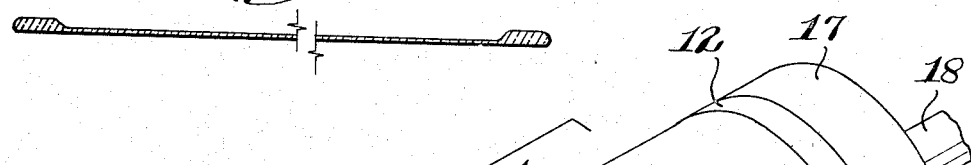
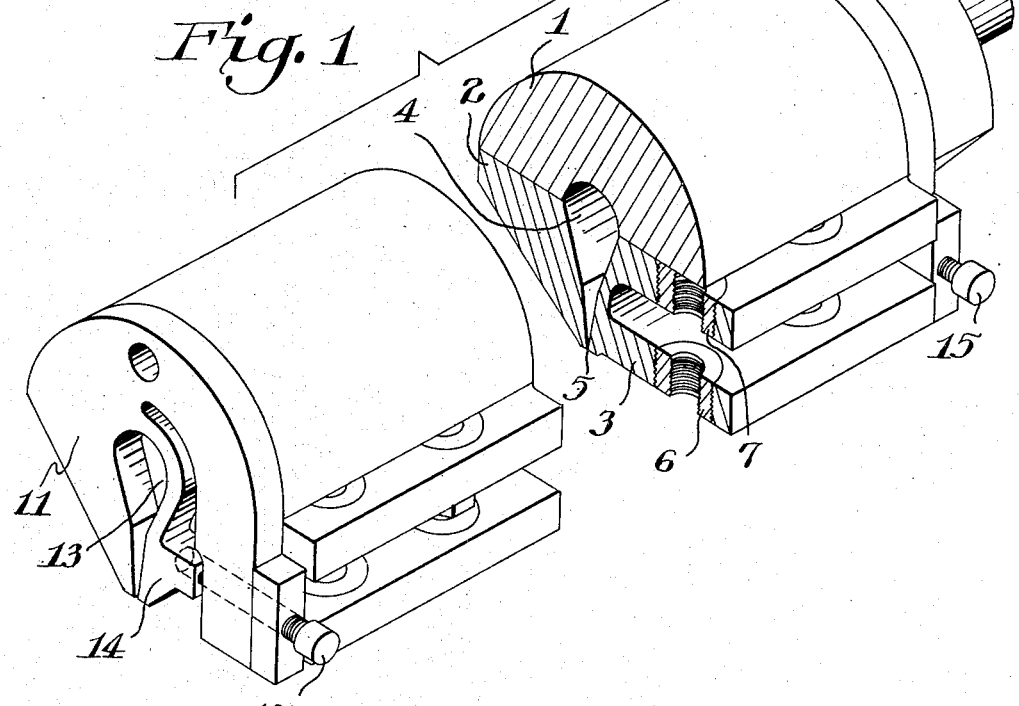
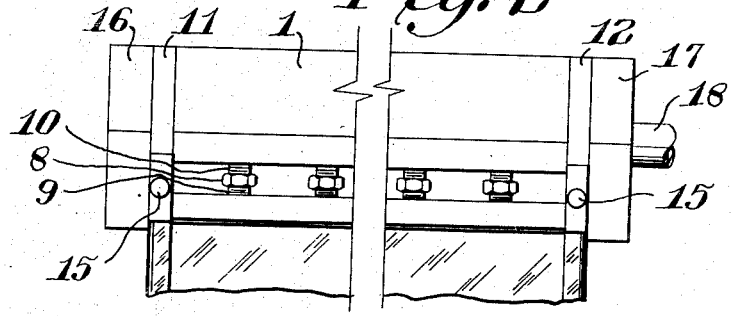
INVENTOR
Kenneth L. Knox
BY *A. Ralph Snyder*
ATTORNEY Patented Aug. 24, 1954

2,686,931

UNITED STATES PATENT OFFICE 2,686,931

APPARATUS FOR EXTRUDING BEADED FILM

Kenneth L. Knox, Tonawanda, N. Y., assignor to E. I. du Pont de Nemours and Company, Wilmington, Del., a corporation of Delaware Application October 27, 1952, Serial No. 317,003

2 Claims. (Cl. 18—12)

This invention relates to apparatus for extruding thermoplastic polymeric materials and, more particularly, to apparatus for extruding a thermoplastic polymeric material into the form of a film having beaded edges.

Copending application U. S. Serial No. 247,977, filed September 24, 1951, in the name of K. L. Knox, relates to a process of longitudinally stretching film of synthetic, linear, organic, filmforming, polymeric material comprising shaping the longitudinal edges of the film in the form of a beading, and stretching the film longitudinally between spaced stretching rolls driven at differential speeds while maintaining the beaded edges of the film in contact with the surface of the rolls. The provision of beading on the film to be stretched serves to substantially eliminate objectionable uneven width reduction, known as "scalloping," incident to longitudinal stretching of the film by the multiple draw roll technique.

Heretofore, in fabricating film having beaded edges, a number of bead-forming expedients have been employed. For example, film having beaded edges has been cast directly by using an extrusion die having a fixed slot orifice, the opening of which at both ends corresponds to the shape of the bead cross-section desired. Film having beaded edges has also been formed by using a slot orifice which is adjustable along the entire length thereof, the opening at the extremities being adjusted to width greater than the width of the opening of the rest of the orifice. Another method employed consisted in permitting the extruded film in molten condition to lose width or "neckin," this resulting in the formation of beaded edges on the film as it passed from the orifice to a quench drum or other means of quenching. Still another method of forming a film having beaded edges comprised the use of air jets so disposed as to blow air toward the edges of the film as the molten film passed from the orifice to the quenching means.

The main disadvantage in fabricating beaded film by the expedients described above resides in the fact that the film thickness in portions adjacent the beaded edges varies appreciably from the thickness of the middle portion and/or the bead thicknesses, i. e., on both sides of the film and along a side, are not uniform. In the case of portions of the film adjacent the bead, the inner edges of the beads are not sharply defined; and from the point of maximum bead thickness, which is normally at least twice as thick as the main body of the film, the film thickness tapers over a considerable portion of the width to the thickness desired. Stretching a beaded film of this type results in the formation of a film having a variable thickness along both edge portions, the areas of variable thickness extending over a considerable portion of the film width. This results in excessive film waste, it being necessary to trim the edge portions along lines of demarcation between the desired caliper or thickness and portions of thickness greater than that desired.

In the case of the formation of beaded edges of non-uniform thickness, this being the main disadvantage of using an extrusion die having a fixed slot orifice and having the openings at both ends corresponding to the shape of the bead cross-section desired, the main resulting difficulty is involved in winding the film into a roll. When wound onto a mandrel, film having beaded edges of non-uniform thickness forms an uneven roll which is more difficult to handle in subsequent unwinding operations.

An object of the present invention is to provide apparatus for extruding a polymeric, filmforming material into a film having beaded edges, the thickness or caliper of the film substantially immediately adjacent the beaded edges being substantially the same as the caliper or thickness of the middle portion of the film. A further object is to provide an apparatus for extruding the polymeric film having beaded edges, the stretching and slitting of which results in a minimum of waste material. Other objects will be apparent from the following description.

The above objects are accomplished by the present invention which, briefly stated, comprises a film extrusion apparatus having a slot orifice and independently-adjustable, bead-forming orifices positioned adjacent to both ends of the slot orifice. The independently-adjustable, beadforming orifices are contained in individual beadforming plates which are positioned adjacent each end of the hopper body in lapping contact. A lapping contact or lapped surface is employed to provide a smooth, sufficiently close contact which permits independent movement between the contacting surfaces and yet prevents the seepage of molten polymer therebetween.

The details of the invention, together with the salient principles thereof and mode of operation, will become more clearly apparent by reference to the following description to be read in connection with the accompanying drawing wherein:

Figure 1 is a perspective view, partly in section, and with parts removed to show details of a specific embodiment of the invention;

Figure 2 is a front view of the embodiment of Figure 1, showing beaded film being extruded; and Figure 3 is a cross-sectional view of typical beaded film extruded from the apparatus of this invention.

Referring to Figure 1, the central section of the extrusion apparatus, constituting the extrusion die for forming the film proper, comprises a main body portion 1 to which is bolted a fixed lip element 2 and an adjustable lip element 3, these three elements together defining a passageway 4 for molten polymer, and slot orifice 5. The adjustable lip element is slotted for its entire length, presenting a substantially, horizontally disposed, U-shaped cross-section, the upper leg of the U being bolted to the main body portion 1 and, hence, rendered immovable. Aligned openings in both legs of lip 3 are fitted with threaded bushings 6 and 7, the interior threading in bushings 7 in the upper leg being coarser than the interior threading in the bushings 6 in the lower leg of lip element 3. Adjusting screws (Figure 2) each consisting of a flatted hex-shaped middle section 8 (adapted to receive a wrench) and screw threaded end sections 9 and 10 screw into bushings 6 and 7 and, when manipulated, operate by reason of the differential action of the screw threads, to bring the legs of lip element 3 closer together or to spread them farther apart, whereby to effect movement of the lip edge of the element 3 and to thus provide for the adjustment of the width of the slot orifice. Disposed at each end of the central section are right- and left-hand adjustable bead blocks 11 and 12, each having a passageway 13 in register with the passageway 4. Adjustable lip 14 of each bead block, integral with the block, is moved by means of an adjusting screw 15, screw-fitted in the main body portion of the block and screwed into the adjustable lip 14. End plate 16 (see Figure 2) fitted against the outer face of bead block 11 and tightly bolted to the main body section 1 serves to seal one end of the extrusion apparatus and to position block 11 against the end of the central section of the apparatus. Head plate 17 of similar construction, but provided with a molten polymer inlet conduit 18, connecting with the passageways 13 and 4, is mounted in like manner at the outer face of bead block 12 and serves to seal the opposite end of the extruder. The inner faces of end plate 16 and head plate 17, both faces of bead blocks 11 and 12, and the ends of the central section, are all accurately ground to provide a lapped fit in each instance, whereby adjustable lips 13 may be freely moved, independently of the adjacent surfaces and without seepage of polymer from between the contacting metal surfaces at the bead blocks even under relatively high extrusion pressures.

In operation, the adjustable hopper lip 3 is preadjusted by means of the adjusting screws to form a film of the desired caliper; and the adjustable lips of the bead blocks are independently preadjusted to form at the edges of the film a bead of, say, double the thickness of the film. A melt of any desired type of synthetic, linear, organic, film-forming, polymeric material, such as polyethylene terephthalate (U. S. P. 2,465,319), polyamides, e. g., polyhexamethylene adipamide, polyhexamethylene sebacamide, polycaproamide, etc., vinylidene chloride, rubber hydrochloride, polystyrene, etc., may then be fed into the apparatus through conduit 18 and extruded to form a beaded film having the typical cross-section illustrated in Figure 3. It will be observed that the main body of the film is substantially uniform over the entire width of film between the beads. In other words, the bead thickness does not diminish gradually over a portion of the width of the film, but is reduced sharply at the interface between the bead-forming orifice and the film-forming orifice, thus resulting in a sharp demarcation between the thickness of the bead and the thickness of the film. It should be understood, however, that the corners of the bead between the film and bead are rounded, and the junction between the bead and film is not a point of weakness. Obviously, the formation of such a bead results in appreciably less wasted material, that is, the portions of the film which must be trimmed from each side in order to obtain a film having uniform thickness.

It is to be understood that the specific embodiment just described is for purposes of illustration only, and that the invention is not restricted to the specific structure of extruder lip and lip adjustment shown, but comprehends rather, any convenient construction, provided only that the apparatus shall comprise independently adjustable bead blocks mounted at and in communication with the ends of the conventional slot orifice type of extruder, and in lapping contact with said ends whereby relatively free movement of the adjustable elements of the bead blocks is realized with freedom from molten polymer seepage at the contacting surfaces under substantially all operating conditions likely to be encountered.

It will be obvious from the foregoing that the chief advantage of the present invention is that it provides apparatus for extruding a film having beaded edges, the film having a substantially uniform thickness between the beaded edges. A further advantage of the present invention is that it provides for preparing a beaded film requiring only a minimum of edge trimming.

The present apparatus is particularly advantageous when employed in conjunction with a continuous longitudinal and lateral stretching apparatus. For example, in the case of stretching longitudinally and/or laterally by means of a tentering apparatus in which the edges of the film are grasped by tenter clips, a tapered beaded edge, i. e., the outer edge of the bead being thicker than the inner edge, provides a more suitable gripping edge for the tenter clips; and it enables the clips to seat firmly on the beaded edges. The present apparatus may be employed to form film having tapered beaded edges.

Polyethylene terephthalate film, particularly when stretched in one or both directions, may be used in a large variety of applications; and, owing to the outstanding strength and toughness of the film in oriented form, it can be used in calipers as low as 0.00025″. On the other hand, the films are transparent and of high clarity in calipers up to 0.005″–0.010″. Included among the general and many specific uses for polyethylene terephthalate film are the following: general wrapping and packaging of items such as rice, dried beans, sugar, coffee, fresh produce, soap powders, cigars, cigarettes, pipe tobacco, cement, automobile tires, textiles, greased and untreated machine parts, hardware, gift wrapping, etc.; packaging of articles to be sterilized, such as medicaments, instruments, chemicals, ointments, gauze, bandages, and the like; packaging of foodstuff which may be heated in the package and stored, such as various red meats, squash, cranberries, hamburgers, frankfurters, popcorn, etc.; glass replacement for storm, greenhouse and chicken house windows; polarizing film for automobile headlights and windshields; safety-glass interlayer, e. g., as an interlayer for laminating glass-to-glass or for laminating glass-to-polymethyl methacrylate; windows for containers and envelopes; transparent cans; container and bottle cap liners; laminations with metal foil to give metallic effects in fabrics; laminations with wood, paper or fabrics for pictures, book covers, wall protectors for around light switches, etc.; wallpaper in clear, pigmented or printed form; millinery applications, for example, in braid form either alone or laminated to another film of a different color; one-way stretched film for tear tapes for packages, e. g., cigarette packages; pressure sensitive tapes and adhesive tapes, particularly, one-way stretched film or one-way stretched film which is cross-laminated; transparent measuring tapes; various electrical applications such as slot insulation for motors, small coils in the form of metal laminations for telephone and radio equipment, primary insulation for heat-resistant wire, electrical insulation tape, split mica insulating tape, e. g., mica sheets laminated between film, small condensers, e. g., metal foil laminated to film, weather resistant electrical wire, e. g., a conductor wrapped with film and coated with asphalt, wrapping for submerged pipe to insulate against ground currents, laminations with paper to improve dielectric strength of the paper, etc., sound recording discs, tapes and magnetic tapes, particularly those types fabricated from one-way stretched film or cross-laminated one-way stretched films; plastic binder for strengthening non-woven fabrics; parting sheets for low pressure laminating; fabric replacement for garment bags, shoulder covers, etc.; tubing for replacing metal tubing in various applications; protective devices such as face shields, goggles, etc.; base film for metallizing by vacuum deposition, sputtering or other techniques; photographic film base for black and white or color photography; ropes or belts fabricated by twisting and/or braiding ribbons or filaments; bacteriostatic applications for inhibiting mold growth, mildew or bacteria growth; barrier against diffusion of gases, e. g., as a barrier against diffusion of dichlorodifluoromethane from refrigerator systems; for air filters based on electrostatic action, e. g., composites of shredded films or ribbons as a filter medium in circulating air heating and cooling systems; protective surfacing film for thermal insulation, e. g., as a protective wrapping for rock wool batts; outside wrapping or inside liner for piping of all types, particularly plastic piping; as a base sheet for deep drawing or forming operations, e. g., forming sheets into the shape of containers, dishes, plates for food stuff, hardware, etc.; cross-lamination of one-way stretched sheets employing a pigmented or colored adhesive, the laminations being employed in window shades, awnings, tarpaulins, etc.; and various specific applications such as playing cards, greeting cards, milk bottle hoods, drinking straws, tying ribbon, tracing cloth, display and picnic dishes, disposable protectors against war gases, showcase covers, ground floors for tents, tent windows, printed charts, nomographs and scales, umbrellas, raincoats, file folders, refrigerator bags, tobacco pouches, snare and base drum heads, tops for convertible automobiles, covers for automobiles in shipment and storage, display card holders, ticker tape, heat-shrinkable bands, protective covering for flash bulbs, applied in the form of a heat-shrinkable film, bottle caps, window shades, etc.

As many widely different embodiments may be made without departing from the spirit and scope of the invention, it is to be understood that said invention is in no wise restricted save as set forth in the appended claims.

I claim:

1. Extrusion apparatus for forming a film having beaded edges comprising in combination an open-ended, elongated middle chamber adapted to receive molten polymer, a slot opening extending the full length of said chamber and defining a film extrusion die, open-ended end chambers lap-fitted at one end to each end of said open-ended middle chamber and in communication therewith, said end chambers having full length orifices therein each defined by a fixed lip and an opposed movable lip, and aligned with and forming continuations of the slot in the middle chamber, end-closure plates lap-fitted to the free end of each of said end chambers, and means for moving said movable lips relative to said middle chamber and end-closure plates, whereby to provide independent adjustment of the width of the orifices in said end chambers.

2. The apparatus of claim 1 wherein the slot in said middle is defined by an immovable lip and a movable lip, whereby to provide for adjustment of the width of said slot.

References Cited in the file of this patent

UNITED STATES PATENTS

| Number | Name | Date |
|---|---|---|
| 1,252,821 | Lewis | Jan. 8, 1918 |
| 1,350,722 | Goodenberger | Aug. 24, 1920 |